United States Patent [19]
Kellström et al.

[11] Patent Number: 5,779,419
[45] Date of Patent: Jul. 14, 1998

[54] HYDRAULIC NUT FOR MOUNTING CONICAL OBJECTS

[75] Inventors: Magnus Kellström; Kenneth Pettersson. both of Partille, Sweden; Magnus Rydin. Amsterdam, Netherlands

[73] Assignee: SKF Maintenance Products B.V., Mijdrecht, Netherlands

[21] Appl. No.: 578,233

[22] Filed: Dec. 26, 1995

[30] Foreign Application Priority Data

Dec. 23, 1994 [NL] Netherlands ............... 9402211

[51] Int. Cl.$^6$ .................................................. F16B 37/08
[52] U.S. Cl. .......................................... 411/434; 411/14
[58] Field of Search ................................. 411/14, 8, 434, 411/432, 917, 916; 116/DIG. 34; 73/761, 866.5

[56] References Cited

U.S. PATENT DOCUMENTS

| 2,995,033 | 8/1961 | Stifano ................. 73/761 |
| 3,033,597 | 5/1962 | Miller . |
| 3,936,104 | 2/1976 | Brinkman . |
| 3,957,319 | 5/1976 | Gorski . |
| 4,411,549 | 10/1983 | Sheppard . |
| 4,646,411 | 3/1987 | Hankins . |
| 4,686,859 | 8/1987 | Wallace ................. 411/14 |
| 5,114,289 | 5/1992 | Coiffman ............... 411/14 |

FOREIGN PATENT DOCUMENTS

| 2 619 428 | 2/1989 | France . |
| 1 108 629 | 6/1961 | Germany . |
| 2052788 | 5/1972 | Germany ............... 411/434 |
| 1418526 | 8/1988 | Russian Federation ... 411/14 |
| 2060186 | 4/1981 | United Kingdom ..... 73/761 |
| WO 92/19878 | 11/1992 | WIPO . |

Primary Examiner—Flemming Saether
Attorney, Agent, or Firm—Young & Thompson

[57] ABSTRACT

A method and hydraulic nut for mounting a hollow article which has a conically shaped opening, such as a conical ring, on a conical shaft. The method comprises the following steps: a) installing the hollow article on the shaft, in order to fit the conically shaped surfaces of the article and the shaft against each other; b) moving the hollow article to a starting position (B), in order to provide an initial press fit; and c) moving the hollow article over a predetermined distance ($S_e$) from the initial position to an end position (C), in order to provide a final press fit.

5 Claims, 2 Drawing Sheets

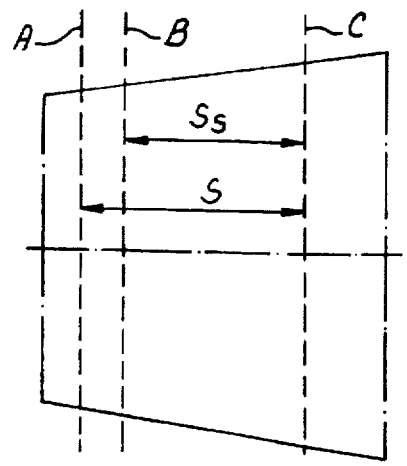
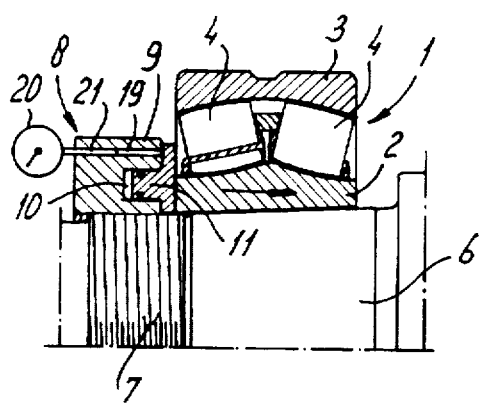
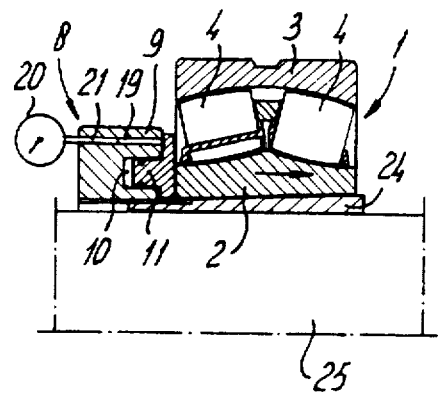
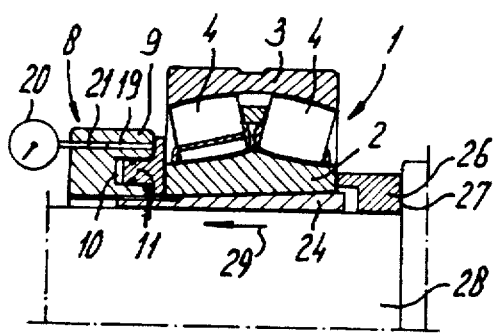
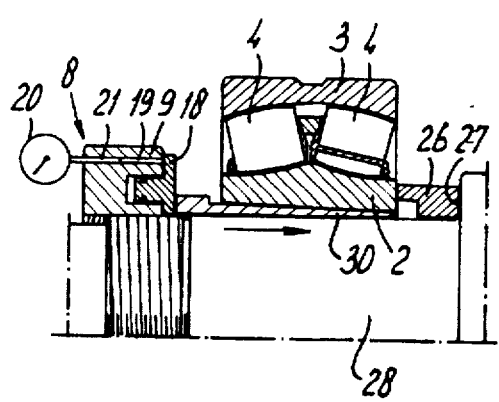

HYDRAULIC NUT FOR MOUNTING CONICAL OBJECTS

FIELD OF THE INVENTION

The invention is related to the subject of mounting conically shaped objects together. An example in this field is the mounting of a bearing on a conical seating. In the process of mounting such objects, internal stresses are generated whereby an interference fit is obtained. The conical object is stretched, whereas the shaft is compressed. The objects concerned may comprise various engineering or machinery components, such as gears, bearings etc.

BACKGROUND OF THE INVENTION

Although high internal stresses lead to a correct interference fit, care should be taken not to overload the objects in order to avoid creep and the development of cracks. On the other hand, low stresses are to be avoided as well having regard to the problems of fretting or stress corrosion.

According to a known method, the objects are mounted by applying a force of a certain magnitude. It is intended to thereby obtain the correct displacement of the objects with respect to each other so as to obtain the desired internal stresses. The disadvantage of this prior art method is that it brings inaccuracies emanating from the unpredictable friction between the objects.

SUMMARY OF THE INVENTION

The aim of the invention is therefore to provide a method for mounting a hollow object having a conically shaped opening, such as a conical ring, on a conical shaft, which provides a predictable result. According to the invention, said method comprises the steps of installing the hollow object on the shaft so as to bring the conically shaped surfaces of said object and shaft into abutting relationship, driving the hollow object to a start position for providing an initial interference fit, driving the hollow object over a predetermined distance from the initial position to a final position for providing a final interference fit.

In driving the hollow object to its start position, any deviations in the shape or surface roughness of the objects, which deviations lead to an unpredictable, non-linear behaviour, are accounted for. Over the trajectory from the start position towards the final position, the behaviour of the objects appears to be well predictable, whereby an accurate mounting is obtained.

In almost all cases, a well-defined start position can be obtained in case the hollow object is driven to the start position by exerting a predetermined axial force thereon. For these cases, the force required to obtain said start position can be determined empirically.

The method according to the invention is in particular suitable for mounting the inner, internally conically shaped race of a rolling element bearing on a shaft. Such bearing has a relatively large radial internal clearance between the rolling elements on the one hand, and the races on the other hand, in unmounted state, and a smaller, nominal radial internal clearance in mounted state.

According to prior art practice, the clearance is usually checked by means of a feeler gauge. Such feeler gauge is inserted between a rolling element and a raceway, in order to establish the play. Upon driving the inner race up the shaft, this play is reduced. Obviously, this method is awkward and time-consuming, having regard to the fact that after each time the inner race has been driven up, the feeler gauge should be inserted. Continuous measurements are not possible since the mounting process has to be interrupted each time the feeler gauge is inserted.

Moreover, this process could easily lead to overloadings in case the inner race appears to be driven up too far.

Furthermore, the bearing space between the races and the rolling elements may not always be well accessible for insertion of the feeler gauge, in particular in a machine environment. Often, a hydraulic nut is applied in driving up the inner race, which nut further reduces the available access.

This problem is further aggravated in case sealed rolling element bearings are employed. The seals on both sides prevent the insertion of a feeler gauge all together.

Finally, incorrect readings might be obtained in case the races and rolling elements are not correctly centred.

The object of the invention is therefore also to provide a method which does not have these disadvantages. According to the invention, this is achieved by driving up the inner race from the initial position to the final position over such a distance that the nominal radial internal clearance is obtained. The distance between the start position and the final position can be calculated accurately on the basis of the taper of the inner race and shaft.

For all rolling element bearings in question, the force required for obtaining the start position, together with the distance between the start position and the final position, can be tabulated so as to provide a reference guide enabling a correct mounting procedure.

Preferably, the start position is obtained by applying an axial force which induces a radial internal clearance reduction of $0.09 \times 10^{-3} \times d$ (d=diameter of inner race). These forces can be determined empirically and tabulated.

Furthermore, preferably, starting from the start position, the final position of the inner race is obtained by displacing the inner race over a distance which induces a radial internal clearance reduction of $0.6 \times 10^{-3} 3 \times d$ (d=diameter of inner race). The distances can be derived from the taper of the objects, and can be tabulated as well.

The invention is furthermore related to a hydraulic nut for use in the method for mounting a hollow object having a conically shaped opening, such as a conical ring, on a conical shaft, comprising a nut body having an annular, coaxial cavity as well as a ringlike piston which is displaceable within said cavity.

Such hydraulic nuts are known per se. In order to make the nut suitable for application in the method according to the invention, measuring means are provided for measuring the axial displacement of the ringlike piston with respect to the nut body.

Preferably, the nut body has an axial hole in which a measuring device can be mounted, and the piston has a reference which can be detected by a probe of the measuring device. The probe can comprise an axially displaceable pin protruding from the axial hole, and the piston can have an abutment surface against which the pin can rest. In order to compensate for possible misalignments, more than one, e.g. three, regularly spaced measuring devices, e.g. dial indicators, might be used.

The piston may comprise a radially outwardly pointing flange forming the abutment surface.

BRIEF DESCRIPTION OF THE DRAWINGS

The invention will further be explained with reference to several embodiments shown in the figures.

FIG. 2 shows a scheme of the method according to the invention.

FIGS. 3–6 show four different embodiments of a spherical roller bearings in the process of being mounted on the shaft.

DESCRIPTION OF THE PREFERRED EMBODIMENTS

Figure 1:
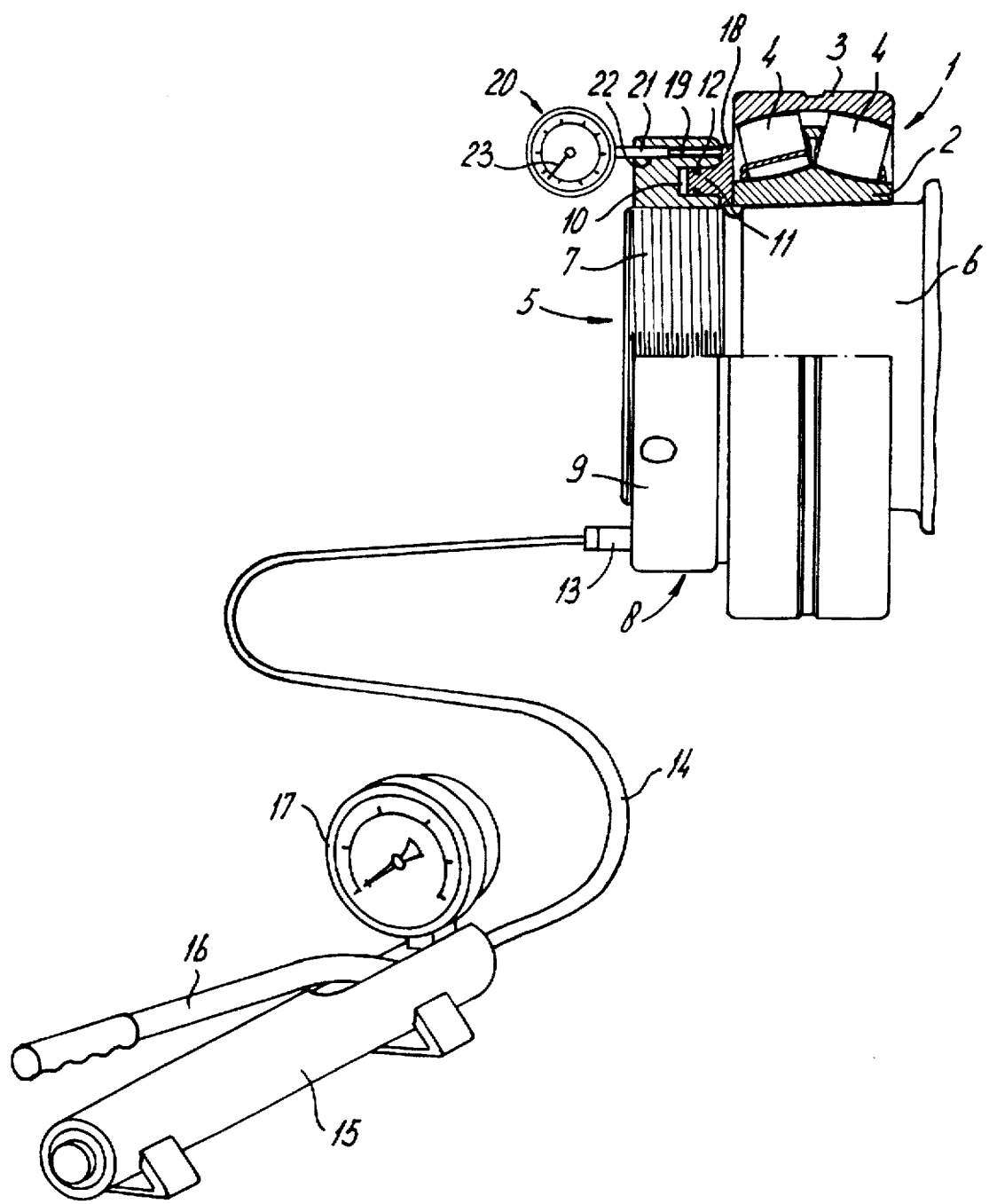
FIG. 1 shows an overall view of the subject of the invention.

FIG. 1 shows a spherical rolling bearing 1, comprising an inner race 2, which has a conically shaped inner surface, an outer race 3 with a spherical race way, as well as two rows of rollers 4.

The spherical roller bearing 1 is being mounted on stub 5, comprising a conically shaped part 6, as well as a screw threaded part 7.

A hydraulic nut 8 has been screwed onto the screw threaded part 7. This hydraulic nut 8 comprises a nut body 9 and which has a coaxial annular chamber 10. In said chamber 10 a ring-like piston 11 has been slidingly accommodated. By means of seals 12, the piston 11 has been sealed with respect to the cylindrical walls of chamber 10.

By means of connector 13, chamber 10 is connected to a hydraulic hose 14, which in turn is connected to a hydraulic pump 15. The oil can be pumped from pump 15 by moving handle 16 up and down. Gauge 17 shows the oil pressure.

As shown in FIG. 1, piston 11 rests against inner race 2 of spherical roller bearing 1. By pumping oil into chamber 10, ring 2 is driven up the conically shaped part 6 of stub 5.

Piston 11 also has a radially outwardly pointing flange 18, against which measuring pin 19 rests. This pin forms part of distance measuring device 20, which contains a screw threaded housing 21 screwed into bore 22 provided in nut body 9. Dial indicator 23 is connected to the axially movable pin 19, so as to enable the measurement of the relative axial displacement between nut body 9 and piston 11. As mentioned, the system shown in FIG. 1 is used for carrying out the method according to the invention. For a description of this method, reference is made to both FIG. 1 and 2.

In the process of mounting the spherical roller bearing 1 onto stub 5, bearing 1, in particular inner race 2 thereof, is slid over stub 5 until the conically shaped surfaces of inner race 2 and stub 5 abut each other. At that position, no or hardly any clamping action exists yet. This position of spherical roller bearing is indicated with A (zero position) in FIG. 2.

Subsequently, the inner race 2 is driven up to the start position B, by pumping oil into chamber 10 of hydraulic nut 8.

The force or pressure required to obtain this start position B can be read from a table in which for all relevant dimensions of roller bearing 1, these values have been tabulated. These values have been determinate empirically. It has been established that a start position, corresponding to a certain small initial interference, is reached when a reduction in the radial internal bearing clearance of $0.09 \times 10^{-3} \times d$ has been achieved. The values related to such radial internal clearance reduction have been tabulated.

Once the start position B has been reached, the inner race 2 is driven up over a distance $S_r$, towards final position C. The distance $S_r$ can be read from a table as well. These distances have been calculated on the basis of the taper of the object, in combination with the prescription that a reduction in radial internal bearing clearance of $0.6 \times 10^{-3} \times d$ mm should be reached. With reference S, the distance between the position wherein the bearing is placed by hand, and the final position has been indicated.

The axial drive-up distances required to obtain this condition can also be read from a table. It is to be noted that the reduction of $6.6 \times 10^{-3} \times d$ mm occurs in driving up the inner race from the start position B to its final position C.

As shown in FIGS. 3 and 4, the method can both be applied in cases where there is only one sliding surface (FIGS. 3 and 4), as well as in cases where two sliding surfaces exist (FIGS. 5 and 6).

FIG. 3 corresponds to the case of FIG. 1; in FIG. 4 an auxiliary sleeve 24 has been provided. This sleeve 24 has a cylindrical bore, fitted on a cylindrical shaft 25. The outer surface of the sleeve 24 is partly tapered, and is partly cylindrical with screw thread so as to mount hydraulic nut 8 thereon.

In the case of FIG. 5 the inner race 2 is in a fixed position. Inner race 2 rests against a ring 26, which in turn rests against an abutment 27 of shaft 28. The auxiliary sleeve 24 is now sliding in the direction of the arrow 29, whereby it slides both over the inner race 2 as well as over the shaft 28.

The same situation, wherein a sliding over two surfaces occurs, is shown in FIG. 6. Here as well, ring 30, which is cylindrical on the inside, and tapered on the outside, slides between inner race 2 and shaft 28. In the cases of FIGS. 5 and 6, of course a larger force is required to obtain the start position B. The forces in these situations can be obtained empirically as well, and tabulated.

We claim:

1. In a hydraulic nut for use and mounting a hollow object having a conically shaped opening on a conical shaft, said nut comprising:
    a nut body having an annular, coaxial cavity;
    a ring like piston which is displaceable within said cavity;
    wherein the improvement comprises measuring means for measuring the axial displacement of the ring like piston with respect to the nut body.

2. The hydraulic nut according to claim 1, wherein said measuring means comprise a housing having a probe extending from the housing, the nut body comprises an axial hole for accommodating the housing, and wherein the piston comprises a reference whose movement is detected by the probe.

3. The hydraulic nut according to claim 2, wherein the probe is an axially displaceable pin protruding from the axial hole, and the reference is an abutment surface.

4. The hydraulic nut according to claim 3, wherein the abutment surface is a radially outwardly pointing flange.

5. The hydraulic nut according to claim 1, wherein the measuring means comprise a screw threaded housing having a probe extending therefrom, and a gauge.

* * * * *